United States Patent [19]

Gohara et al.

[11] Patent Number: 5,451,250
[45] Date of Patent: Sep. 19, 1995

[54] METHOD OF CONVERT A DOUBLE-LOOP FLUE GAS DESULFURIZATION SYSTEM TO A SINGLE-LOOP SYSTEM

[75] Inventors: Wadie F. Gohara, Barberton; Steve Feeney, Norton, both of Ohio

[73] Assignee: The Babcock & Wilcox Company, New Orleans, La.

[21] Appl. No.: 241,266

[22] Filed: May 11, 1994

[51] Int. Cl.⁶ .................. B01D 53/18; B01D 53/50
[52] U.S. Cl. .......................... 95/187; 95/195; 95/200; 95/224; 95/235; 423/242.1; 423/243.01
[58] Field of Search .................. 95/187, 195, 199, 200, 95/210, 211, 213, 224, 235; 423/242.1, 243.01, 243.03

[56] References Cited

U.S. PATENT DOCUMENTS

| | | | |
|---|---|---|---|
| 4,375,976 | 3/1983 | Potter | 95/195 X |
| 5,308,509 | 5/1994 | Bhat et al. | 95/195 X |
| 5,354,482 | 10/1994 | Varadi | 95/187 X |

FOREIGN PATENT DOCUMENTS

2017525 10/1979 United Kingdom .............. 95/187

Primary Examiner—Robert Spitzer
Attorney, Agent, or Firm—Daniel S. Kalka; Robert J. Edwards

[57] ABSTRACT

A method for converting a double-loop flue gas desulfurization system to a single-loop desulfurization system includes removing the deep packing from the scrubber housing and replacing the packing with a thin tray having a plurality of perforations. The return line which connects the bowl is removed from the feed tank; and a plurality of openings, apertures or perforations are provided in the shroud ring and the bowl of the housing in order to permit slurry to pass from upper spray headers to the bottom of the housing as well as permit flue gas flow upwardly through the housing to the flue gas outlet. The lower spray headers are removed from the housing and the feed line connected to the lower spray headers is reconnected to the feed tank for providing the single-loop. An oxidation air system is provided in the feed tank for creating an in-situ forced oxidation system.

10 Claims, 7 Drawing Sheets

METHOD OF CONVERT A DOUBLE-LOOP FLUE GAS DESULFURIZATION SYSTEM TO A SINGLE-LOOP SYSTEM

BACKGROUND OF THE INVENTION

1. Field of the Invention

The present invention relates, in general, to the desulfurization of flue gas and, in particular, to a new and useful method for converting a double-loop flue gas desulfurization system to a single-loop flue gas desulfurization system.

2. Description of the Related Art

It is well-known that there are numerous flue gas desulfurization (FGD) systems available and that the majority of these systems fall under two categories. The first category is the single loop system. In single loop systems, the recirculation tank and the scrubbing zone are combined in one structure. The liquor sprayed in the scrubbing zone captures $SO_2$ and looses its alkalinity. The pH of the liquor leaving the scrubbing zone falls to about pH 4.5. The low pH scrubbing liquor then falls into the recirculation tank where it mixes with the large volume of alkaline slurry in the tank and the pH of the recirculated liquor is raised to the process set point. Fresh slurry is added to control the pH of the liquor in the tank to preset relatively acidic pH varying from 5.8 to 6.2.

The recirculation tank volume is usually set to allow a certain solids residence time in the tank. The longer the residence time of the solids in the tank, the higher is the reagent utilization. Improved limestone utilization translates into more economic scrubbing.

The gas inlet of such systems is usually at an elevation above the liquid level in the tank which may be 25 to 30 feet above ground level in order to accommodate the solid residence time requirements.

The second category is the double-loop system. In this system, there are two loops which are virtually separate from each other. The scrubbing loop contains the fresh alkaline slurry. The slurry is then sprayed over several layers of packing to enhance the $SO_2$ removal capability of the system. The contact between the liquor on the packing and the flue gas causes the pH of the slurry leaving the packing to drop. This is similar to the single-loop system.

Then, the reacted slurry, which is fairly low in pH, is collected in a bowl and returned to an external tank. The same parameters which govern the tank volume and size in the single-loop system also apply to the dual-loop system. Therefore, the size of the external tank is approximately the same as the size of a recirculation tank in a single-loop system.

Fresh slurry is added to the recirculation tank to maintain the process set pH and the adjusted pH slurry is recirculated from the recirculation tank to the spray zone over the packing. Slurry from the recirculation tank overflows into the bottom of the scrubber, under the bowl, and is recirculated through a second loop to a set of headers, also located under the bowl. The function of these headers is to humidify the flue gas entering the scrubber so that wet/dry interface deposits do not form and assist in the scrubbing process. Exhausted liquor is usually drawn from the bottom of the scrubber based on the preset level.

The lower loop usually runs at a lower pH than the upper loop enhancing limestone utilization and reducing operating costs.

The level of liquid in the integral scrubber tank of a dual loop system is about 8 to 10 feet which places the gas inlet about 15 to 20 feet below the gas inlet of a single-loop system. Accordingly, this presents a problem to owners who want to upgrade a dual-loop system to a single-loop system.

Dual-loop systems are prone to many problems because of the separation of the loops. For example, the operator of a naturally oxidized dual-loop system does not have the flexibility to benefit from burning low sulfur coal. Low sulfur coals tend to have higher natural oxidation in a naturally oxidized system than high sulfur coal. Oxidation rates between 15% and 90% generally result in scaling and plugging of the packing, which reduces the reliability of the system and $SO_2$ removal capability as the plugging progress. In addition, the system resistance is variable and dependent on the packing cleanliness and condition.

Due to the high $SO_2$ removal of the lower loop, when organic acids are used, a dual loop system tends to plug the packing with scale build up. Single loop systems using organic acid buffers are immune to this problem.

Due to the use of a shallow integral tank, dual-loop systems are difficult and expensive to convert to a single-loop system if the same external recirculation tank residence time is required. Owners of dual-loop system who have problems with packing plugging have a hard time cleaning the packing section, which is normally 2 or 3 feet deep, without causing extensive damage to the packing. They also have a hard time converting the dual-loop system to use in-situ forced oxidation in order to convert the calcium sulfite formed into Gypsum.

SUMMARY OF THE INVENTION

The present invention provides for a method for converting a double-loop flue gas desulfurization system to a single-loop desulfurization system. The method according to the present invention includes removing the packing, which is normally 2 to 3 feet in depth, from the scrubber housing and replacing the packing with a tray having a plurality of perforations. The return line which connects the slurry collection bowl to the slurry recirculation tank, is disconnected from the feed tank; and slots, openings or apertures are cut in the bowl in order to allow slurry to pass through the bowl into the integral absorber tank located at the bottom of the housing as well as permit flue gas to flow upwardly in the housing. Also, slots, apertures or openings are provided in the concentric shroud ring located above the bowl for facilitating even distribution of slurry flow and flue gas across the absorber sectional area.

The lower headers, which are normally located under the bowl in the integrated absorber tank, and feed lines leading from the integral absorber tank to the lower headers, are removed from the housing; and the feed lines are disconnected and reattached to the feed tank.

Oxidation air headers can be provided near the bottom of the feed tank should gypsum production be required, and are lined or connected to an oxidation air system which includes compressors or blowers and an air feed line for oxidizing the slurry located within the feed tank.

An object of the present invention is to provide an easy and inexpensive method to convert a dual-loop flue gas desulfurization system to a single-loop flue gas desulfurization system.

Another object is to rid the system of the scale build up which forms in a dual loop as a result of using organic acids. A single loop is immune to such scale build up.

Another object is to replace the packing used in scrubbers, which plugs and reduces the reliability and availability, with a thin tray having a plurality of perforations which is easy to access, clean, and of higher availability and reliability.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
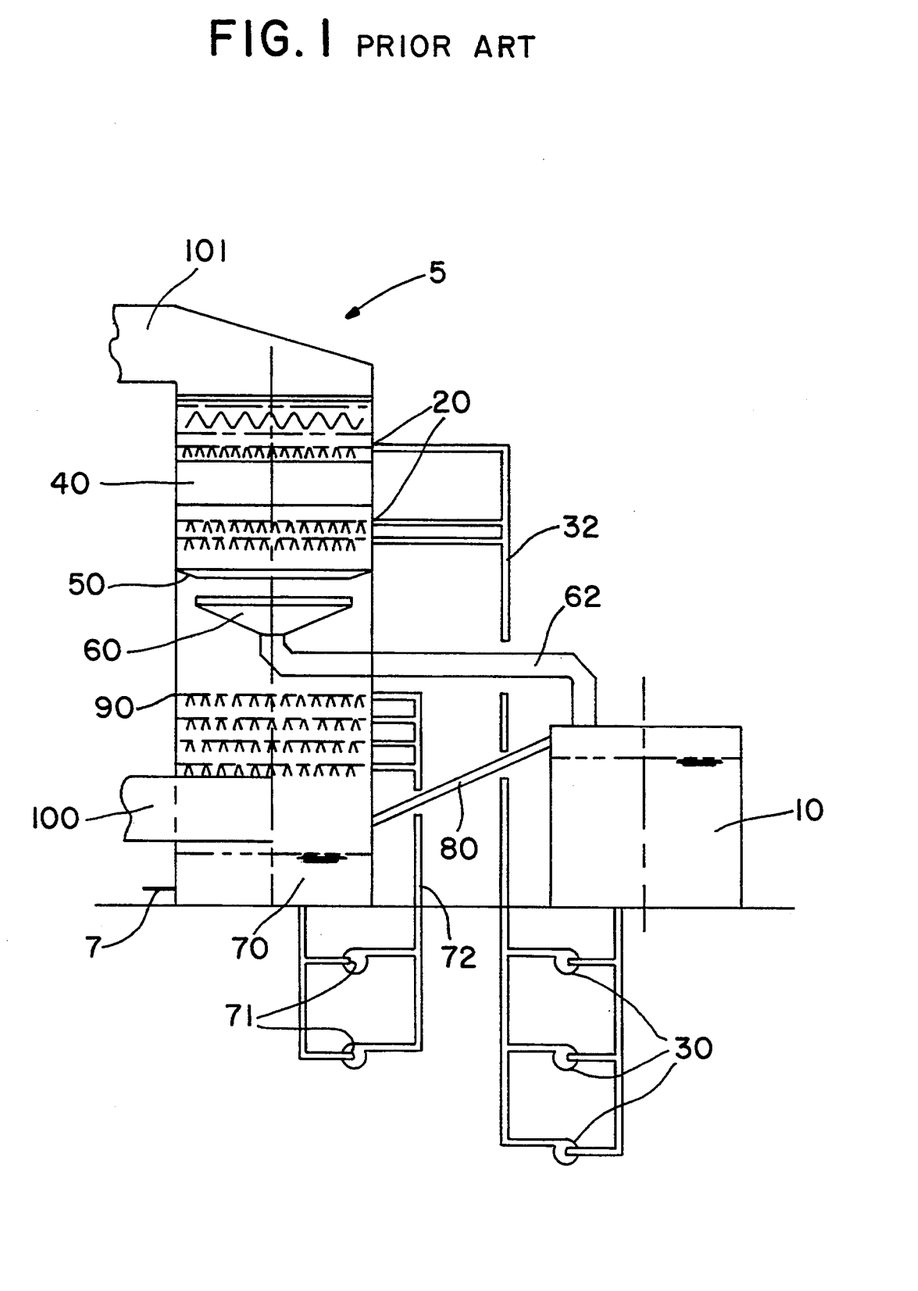
FIG. 1 is a schematic view illustrating a known double-loop flue gas desulfurization system.

FIG. 1 illustrates a known double-loop flue gas desulfurization system comprising a housing, generally designated (5), having an inlet (100) near the bottom of the housing (5) for incoming flue gas. And outlet (101) is located at the top of housing (5) for the exit of flue gas after undergoing a scrubbing process with the housing (5).

Fresh slurry is fed into feed tank (10) and pumped by pumps (30) to a plurality of upper headers (20) located near the top of the housing (5) through a feed line (32) which is connected to the feed tank (10), the pumps (30) and the upper headers (20). The slurry sprayed by upper headers (20) has a high pH and is sprayed onto a packing (40), which is usually layered and has a depth of 2 to 3 feet, for absorbing the $SO_2$ in the high pH slurry and filtering exiting flue gas prior to be channeled through outlet (101).

The sprayed slurry from upper headers (20) trickles over and through the packing (40) and is diverted by a shroud ring (50) which is disposed concentrically around an inner diameter of the housing (5) for channeling slurry through its inner opening to a bowl (60) located directly beneath the shroud ring (50) which collects the slurry. The shroud ring (50) and the bowl (60) prevent the upper loop slurry from being channeled into an integral absorber tank (70) located at the bottom of the housing (5). The slurry collected in bowl (60) is directed back into the feed tank (10) by a return line (62) which is connected to the bowl (60) and the feed tank (10).

As the level of slurry rises in feed tank (10), excess or overflow slurry overflows back into the housing (5) to the integral absorber tank (70) through an overflow line (80) which is connected to the feed tank (10) and the housing (5) at the absorber tank (70). Slurry from the absorber tank (70) is pumped by quencher pumps (71) to an array of lower headers (90) along a lower feed line (72) which is connected to the absorber tank (70). The pumps (71) and the lower headers (90) are used for humidifying, scrubbing and improving the overall reagent utilization within the scrubber housing (5). The level of slurry in absorber tank (70) is maintained below the inlet (100) through the use of purge means, i.e. a purge stream, indicated at (7), which is well-known in the art.

Figure 2:
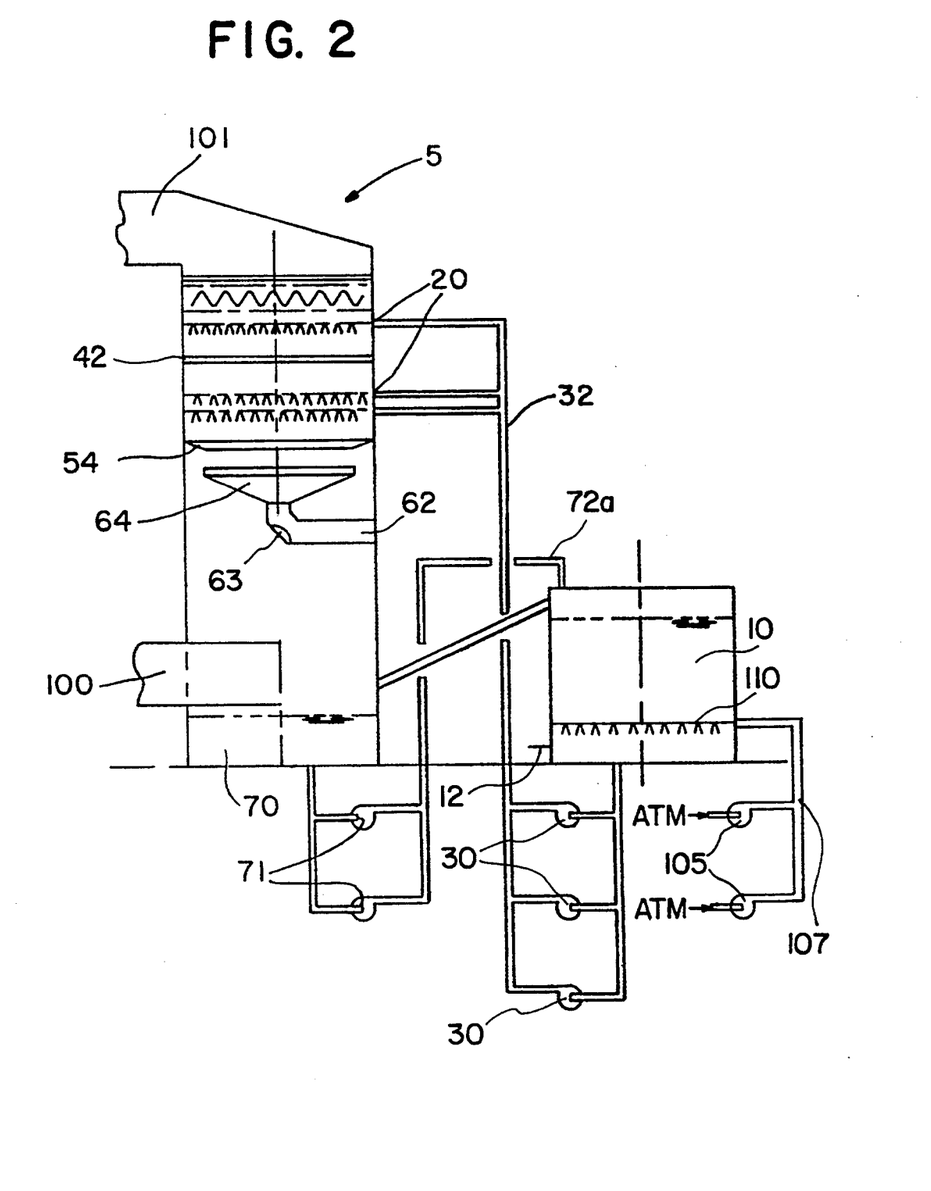
FIG. 2 is a schematic view illustrating a single-loop desulfurization system derived from the system of FIG. 1 after utilizing a method according to the present invention.

FIG. 2 is a schematic illustration of the system of FIG. 1 after employing a conversion method according to the present invention. The same reference numerals are used to designate the same or similar features shown in FIG. 1.

Figure 7:
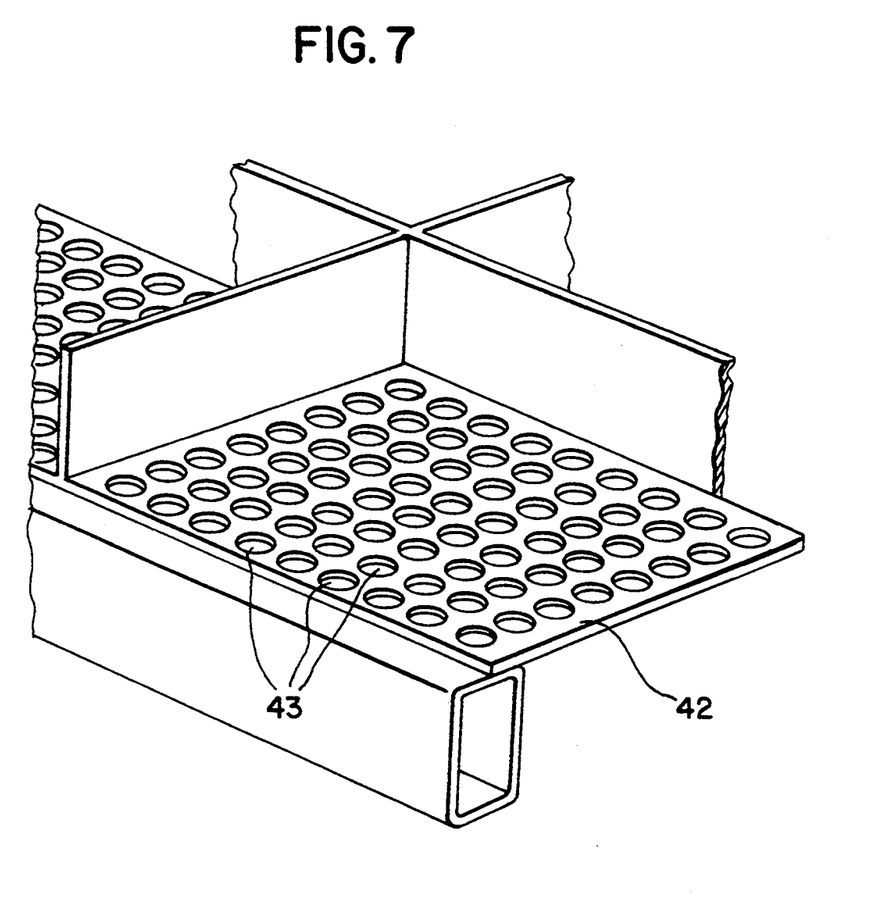
FIG. 7 is a partial perspective view of a tray of FIG. 2.

A method according to the present invention includes removing the packing (40) (FIG. 1), which is usually 2 to 3 feet deep, and replacing the packing (40) with a thin tray (42) at the original location of the packing (40) or locating the tray (42) below the upper spray headers (20) above shroud ring (54) and bowl (64). FIG. 7 shows the tray (42) having a plurality of apertures (43) for passing the slurry flow from upper headers (20) through the thin tray (42) at the apertures (43) as well as for passing flue gas upwardly therethrough. The thin tray (42) facilitates easy cleaning and simple maintenance as opposed to the deep packing (40) used in the known systems of FIG. 1.

As shown in FIG. 2, the return line (62) is removed from the feed tank (10). In order to permit the slurry sprayed from upper headers (20) to flow to the bottom of the housing (5) a plurality of openings (55) and (65) are cut into the shroud ring (54) and the bowl (64) respectively, for permitting the slurry to flow downwardly through housing (5) as well as permit gas flow in an opposite direction toward outlet (101).

Figure 3:
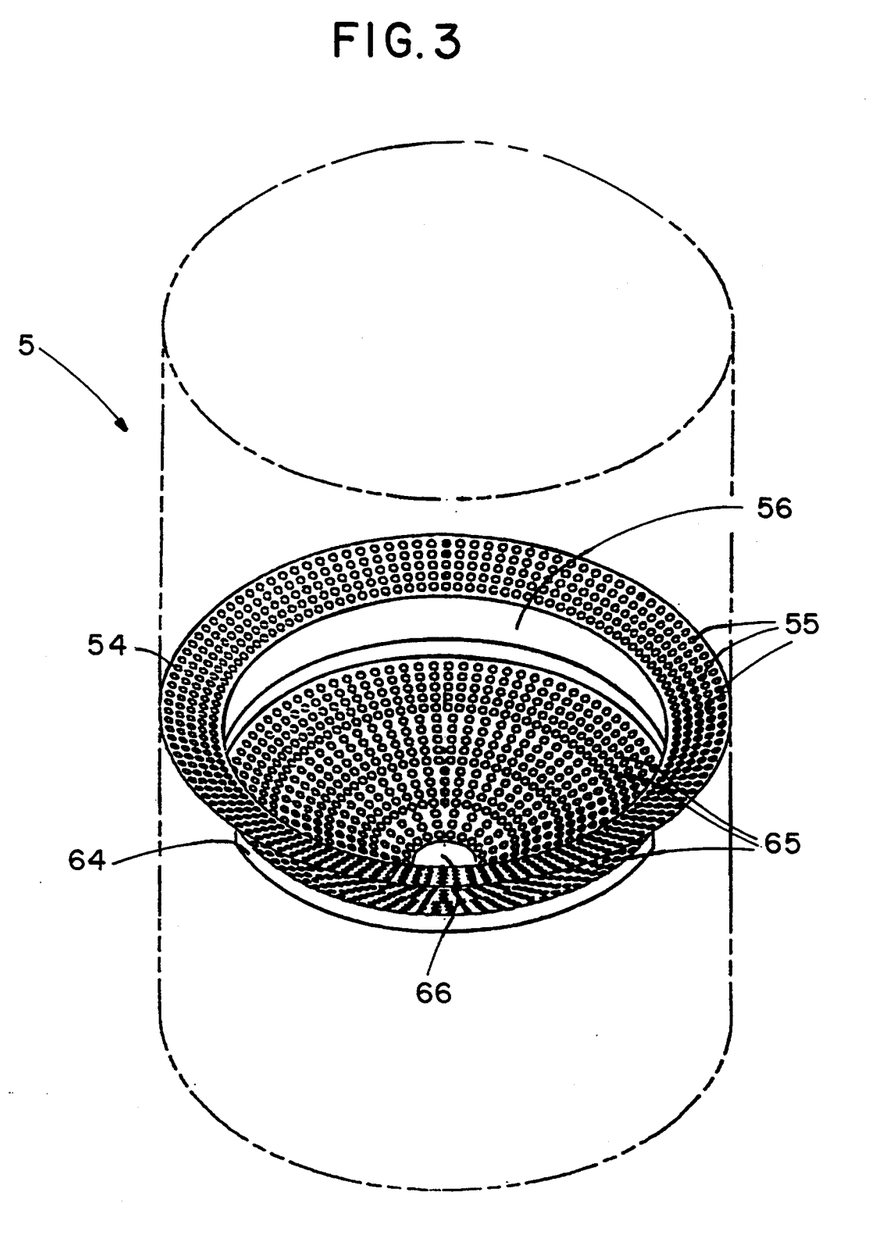
FIG. 3 is a perspective view of a first embodiment of a shroud ring and bowl of FIG. 2.

FIG. 2 also illustrates that an opening (63) can be provided in the remaining return line (62) within housing (5) as another means for permitting slurry flow for the slurry that passes through inner opening (56) of the shroud ring (54) and central opening (66) of the bowl (64) (FIG. 3).

Figure 4:
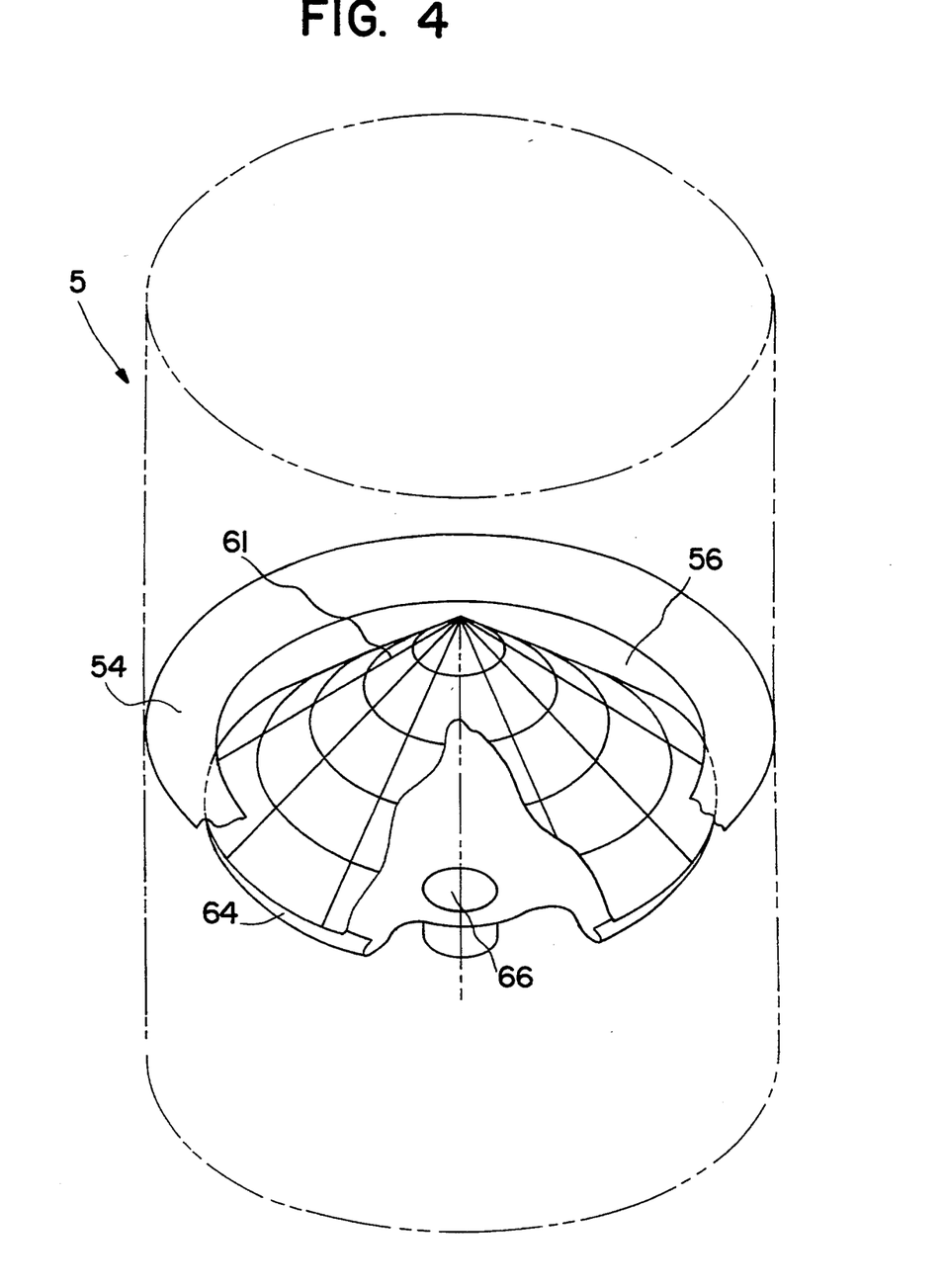
FIG. 4 is a partial perspective view of a second embodiment of the shroud ring and bowl of FIG. 2.

Another embodiment for passing slurry from the upper section of the scrubber housing (5) to the lower section of housing (5), includes placing a top (61) over the bowl (64) as shown in FIG. 4. The top (61) can include various shapes for facilitating slurry deflection, however, it is preferable that the top (61) be conical for permitting slurry to deflect from the top (61) after passing through inner opening (56) of shroud ring (54) for channeling the slurry over the outer circumference of bowl (64) to permit downward flow to the bottom of housing (5).

Figure 6:
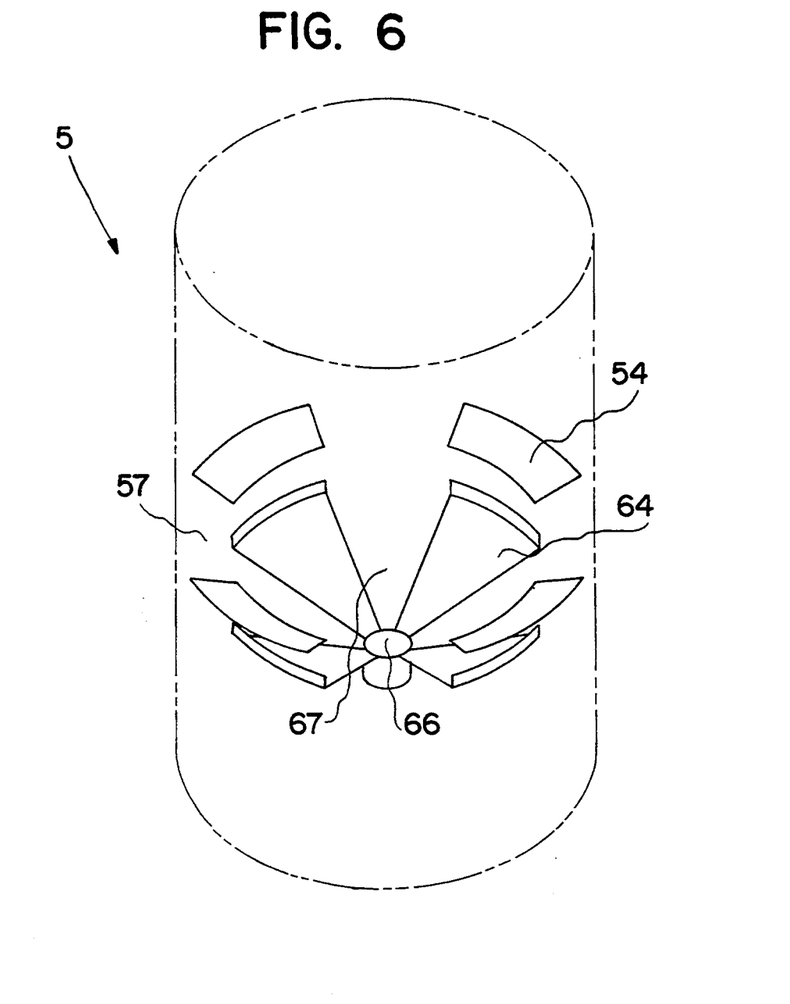
FIG. 6 is a partial perspective view of a third embodiment of the shroud ring and bowl of FIG. 2.

Another means for permitting downward flow of slurry includes providing slots (57) in shroud ring (54) and slots (67) in bowl (64) for permitting downward slurry flow therethrough as shown in FIG. 6.

Figure 5:
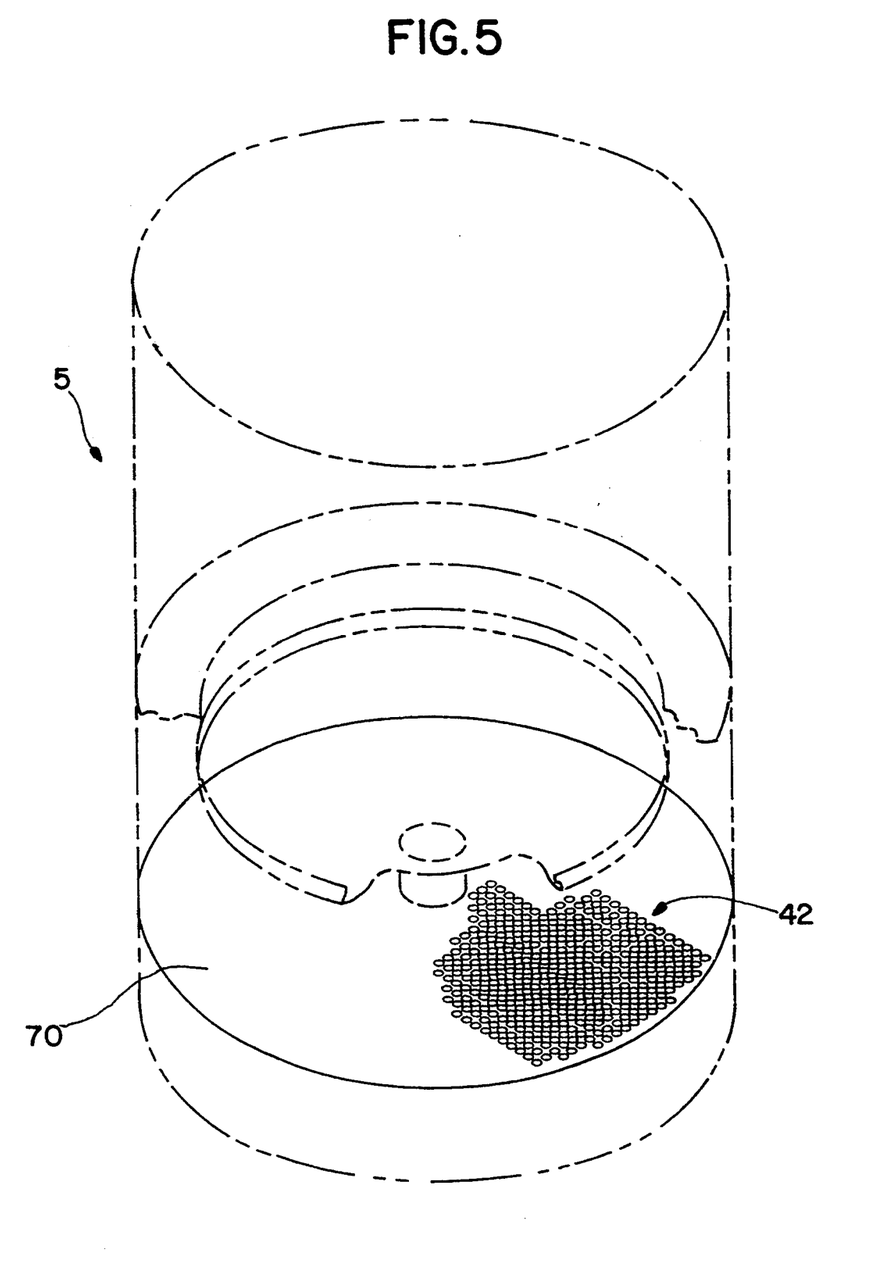
FIG. 5 is a schematic view illustrating the housing of FIG. 2 without a shroud ring and bowl.

Another means for permitting downward slurry flow to absorber tank (70) at the bottom of housing (5), is to remove the shroud ring (54) and the bowl (64) completely from the housing (5) and place the tray (42) at the same location as the bowl using the bowl support steel or between the inlet and the location of the removed bowl which provides an unobstructed flow path of the slurry directly to the absorber tank (70) as shown in FIG. 5.

Additionally, in all the previous cases, recirculation line (72) (FIG. 1) is disconnected from the lower headers (90) and reconnected to feed tank (10) for establishing a direct line (72a) which leads from the absorber tank (70) to the feed tank (10); and the lower headers (90) are removed completely from the housing (5) for establishing a single loop between housing (5) and feed tank (10). The level inside absorber tank (70) is still maintained under the flue gas inlet (100) due to purge means (12) located at the feed tank (10) for purging excess slurry from the system.

The embodiments illustrated in FIGS. 3, 4, 5, and 6, allow for an efficient flue gas distribution beneath the tray (42) (FIG. 2) which allows for the flue gas to flow upwardly in the housing (5) at the perimeter of housing (5) as well as at the axial center of housing (5). These above-listed embodiments facilitate both efficient gas distribution for the upward flow of flue gas to the outlet (101) as well as proper slurry flow downwardly through the housing (5).

Additionally, oxidation headers (110) can be provided in the feed tank (10) but not necessarily needed for the conversion near the bottom of feed tank (10) and are provided with oxidation air by oxidation air compressors or blowers (105) through an oxidation air feed line (107) which is connected to the compressors or blowers (105) and the headers (110) for oxidizing the slurry within feed tank (10). The oxidation system, i.e. headers (110), feed line (107) and compressors or blowers (105), provide for an in-situ forced oxidation system which converts calcium sulfite captured from the gas $SO_2$ and the limestone slurry into gypsum.

There are several advantages in using the method according to the present invention which are listed below.

The tray (42) is easier to reach and clean than 2 or 3 feet of layered packing (40). Also, the flat surfaces of the tray (42) have no corrugations for the slurry to deposit and build on. Accordingly, the tray (42) can be cleaned, if necessary, in place with a high water pressure hose. The packing (40), however, requires removal and is damaged by high water pressure; and use of low pressure water does not clean the packing (40) completely.

Additionally, the slotted bowl (64) and shroud ring (54) provide a means for gas distribution as well as result in a larger gas flow area and reduce the system resistance. Moreover, the lower loop piping (72a) is used to divert the flow from the absorber tank (70) to the upper loop tank (10). The upper loop tank overflow is used to vent the oxidation air and other evolved gases from the upper loop tank to the absorber.

Furthermore, the tray (42) provides a means of contact between the gas and the slurry. Therefore, the system removal efficiency can be maintained.

Also, the wet/dry interface problem is under control because the falling slurry off of the bowl (64) and the slotted shroud ring (54) provides a means to humidify the gas before it reaches the bowl surface.

While specific embodiments of the invention have been shown and described in detail to illustrate the application of the principles of the invention, it will be understood that the invention may be embodied otherwise without departing from such principles.

What is claimed is:

1. A method for converting a double-loop flue gas desulfurization system to a single-loop desulfurization system, the method comprising the steps of:

providing a double-loop desulfurization system comprising a housing having an inlet for incoming flue gas and an outlet for exiting flue gas, upper spray means within the housing near the top of the housing for spraying a slurry into the flue gas, packing means within the housing at a location near the top of the housing for being sprayed with the slurry and for filtering the flue gas as it exits the outlet, a ring having an inner opening disposed concentrically around an inner diameter of the housing, a bowl having a central opening and located beneath the ring, lower spray means within the housing beneath the bowl for spraying the slurry, and absorber area below the lower spray means, a slurry feed tank located outside of the housing, a first slurry feed line leading from the feed tank to the upper spray means, first pump means for pumping slurry through the first feed line to the upper spray means, a second slurry feed line leading from the absorber area to the lower spray means, second pump means for pumping slurry from the absorber area through the second feed line to the lower spray means, and a return line connected to the bowl at the central opening at one end and connected to the feed tank at an opposite end for returning slurry collected in the bowl to the feed tank;

removing the packing means from the housing and replacing the packing means with a tray having a plurality of perforations;

removing the return line from the bowl to the feed tank;

disconnecting the second feed line from the lower spray means and reconnecting the second feed line to the feed tank; and removing the lower spray means from the housing.

2. The method according the claim 1, further including the step of providing oxidation means in the feed tank for oxidizing the slurry in the feed tank.

3. The method according to claim 2, further including the step of providing a plurality of openings in the ring.

4. The method according to claim 3, further including the step of providing a plurality of openings in the bowl.

5. The method according to claim 1, further including the step of providing a plurality of openings in the ring.

6. The method according to claim 5, further including the step of providing a plurality of openings in the bowl.

7. The method according to claim 1, further including the step of providing a conical top on the bowl for covering the bowl and the central opening of the bowl.

8. The method according to claim 1, further including the step of removing the ring from the housing.

9. The method according to claim 8, further including the step of removing the bowl from the housing.

10. The method according to claim 9, further including the step of placing a tray between the location of the removed bowl and the absorber inlet.

\* \* \* \* \*